United States Patent [19]

Magnin

[11] Patent Number: 5,751,778
[45] Date of Patent: May 12, 1998

[54] METHOD FOR CAPTIVELY ATTACHING A GUIDE CONE OF TUBULAR SHAPE AND A THERMAL SLEEVE OF AN ADAPTOR PASSING THROUGH THE HEAD OF THE VESSEL OF A NUCLEAR REACTOR

[75] Inventor: Bernard Magnin, Saint Victor sur Rhins, France

[73] Assignee: Framatome, Courbevoie, France

[21] Appl. No.: 769,355

[22] Filed: Dec. 19, 1996

[30] Foreign Application Priority Data

Dec. 22, 1995 [FR] France .................. 95 15 416

[51] Int. Cl.⁶ .................................................. G21C 19/00
[52] U.S. Cl. .................... 376/260; 29/523; 29/421.2
[58] Field of Search ........................... 376/260, 463; 29/252, 254, 421.1, 421.2, 523

[56] References Cited

U.S. PATENT DOCUMENTS

| | | | |
|---|---|---|---|
| 2,398,633 | 6/1946 | Gazda | 411/333 |
| 3,842,878 | 10/1974 | Duer | 411/276 |
| 4,816,206 | 3/1989 | Savary | 376/228 |
| 4,905,546 | 3/1990 | Katscher et al. | 411/271 |
| 5,432,828 | 7/1995 | Cayment et al. | 376/260 |
| 5,436,944 | 7/1995 | Magnin et al. | 376/249 |
| 5,443,201 | 8/1995 | Cartry | 376/260 |

FOREIGN PATENT DOCUMENTS

| | | |
|---|---|---|
| 0 268 817 | 6/1988 | European Pat. Off. . |
| 1054192 | 2/1954 | France . |
| 2 676 514 | 11/1992 | France . |

*Primary Examiner*—Daniel D. Wasil
*Attorney, Agent, or Firm*—Pollock, Vande Sande & Priddy

[57] ABSTRACT

The method comprises providing an annular cavity in an internal part of a tapped bore of the guide cone, screwing the tapped bore of the guide cone onto the threaded end of the thermal sleeve and expanding at least part of the end of the thermal sleeve radially into the cavity of the guide cone from inside the thermal sleeve and the guide cone.

9 Claims, 7 Drawing Sheets

1

METHOD FOR CAPTIVELY ATTACHING A GUIDE CONE OF TUBULAR SHAPE AND A THERMAL SLEEVE OF AN ADAPTOR PASSING THROUGH THE HEAD OF THE VESSEL OF A NUCLEAR REACTOR

FIELD OF THE INVENTION

The invention relates to a method for captively attaching a tubular guide cone onto a threaded end part of the exterior surface of a thermal sleeve of an adapter of a pressurized-water nuclear reactor.

BACKGROUND OF THE INVENTION

Pressurized-water nuclear reactors include a vessel in which the core of the nuclear reactor is located. The vessel, of cylindrical overall shape, arranged with its axis vertical, is closed at its upper part by a head of domed shape through which tubular penetrations pass, giving access to the core of the nuclear reactor, example for displacing the rods for controlling the reactivity inside the core or for taking temperature measurements.

The tube-shaped components, known as adapters, for passing through the head of the vessel are welded into openings passing through the vessel head, in an arrangement such that their axes are vertical and aligned with the axis of a nuclear fuel assembly of the core arranged in the vessel. Located inside each of the adapters, coaxially and with a certain radial clearance, is a tubular component known as a thermal sleeve. The thermal sleeves include a lower part which, with respect to the adapter, projects below the head of the vessel, this part of the thermal sleeves being situated inside the vessel when the head has been fitted. The projecting lower part of the thermal sleeves includes an end which is threaded over a certain length allowing a guide cone to be screwed onto the lower end of the sleeve, this guide cone being produced in the form of a tubular cylindrical/frustoconical component, the cylindrical part of which includes an internal tapping which is screwed onto the threaded part of the exterior surface of the sleeve. The guide cones of the thermal sleeves of the adapters serve especially to guide the followers of control rods inside the thermal sleeves when the head of the vessel is being fitted back on, for example, after the core of the nuclear reactor has been refueled.

In designing and operating nuclear reactors, it is extremely important to ensure that all the components which come into contact with the primary coolant of the reactor, and particularly all the components of the constituent parts of the reactor which are located inside the vessel, cannot become detached and become migrating bodies which would be carried along at high speed by the reactor coolant.

In the case of the guide cones of the thermal sleeves of the adapters, it has proved desirable to make a completely captive link between the cone and the end of the sleeve. It is quite obvious that a simple screwed connection cannot make the cones completely captive of the sleeves of adapters. Furthermore, supplementing the screwed connection with spotwelds which prevent the cone from rotating on the threaded end of the sleeve is not feasible because the sleeves and guide cones are generally made of nickel alloy or of stainless steel which are difficult to weld, and welding would run the risk of weakening the metal and would require that the sleeve of the adapter be tested.

The adapters which allow thermocouples to pass through the head of the vessel include, at their upper end, above the head of the vessel, a guide cone which is screwed on. It may be desirable to render the guide cone captive.

SUMMARY OF THE INVENTION

The object of the invention is to provide a method for captively attaching a guide cone of tubular shape onto a threaded end part of the exterior surface of a thermal sleeve in such a manner that the components cannot become separated by unscrewing.

To this end, the method of the invention comprises providing an annular cavity in an internal part of a tapped bore of the guide cone, screwing the tapped bore of the guide cone onto the threaded end of the thermal sleeve and expanding at least part of the end of the thermal sleeve radially into the cavity of the guide cone from inside the thermal sleeve and the guide cone.

The invention applies to the attachment of guide cones to the lower end of thermal sleeves of adapters for penetrating through the head of the vessel of a pressurized-water nuclear reactor and of guide cones to the upper end of thermocouple passage adapters.

BRIEF DESCRIPTION OF THE DRAWINGS

In order to make the invention easy to understand, several embodiments of the method according to the invention will now be described by way of examples with reference to the appended drawing figures.

DESCRIPTION OF PREFERRED EMBODIMENT

Figure 1:
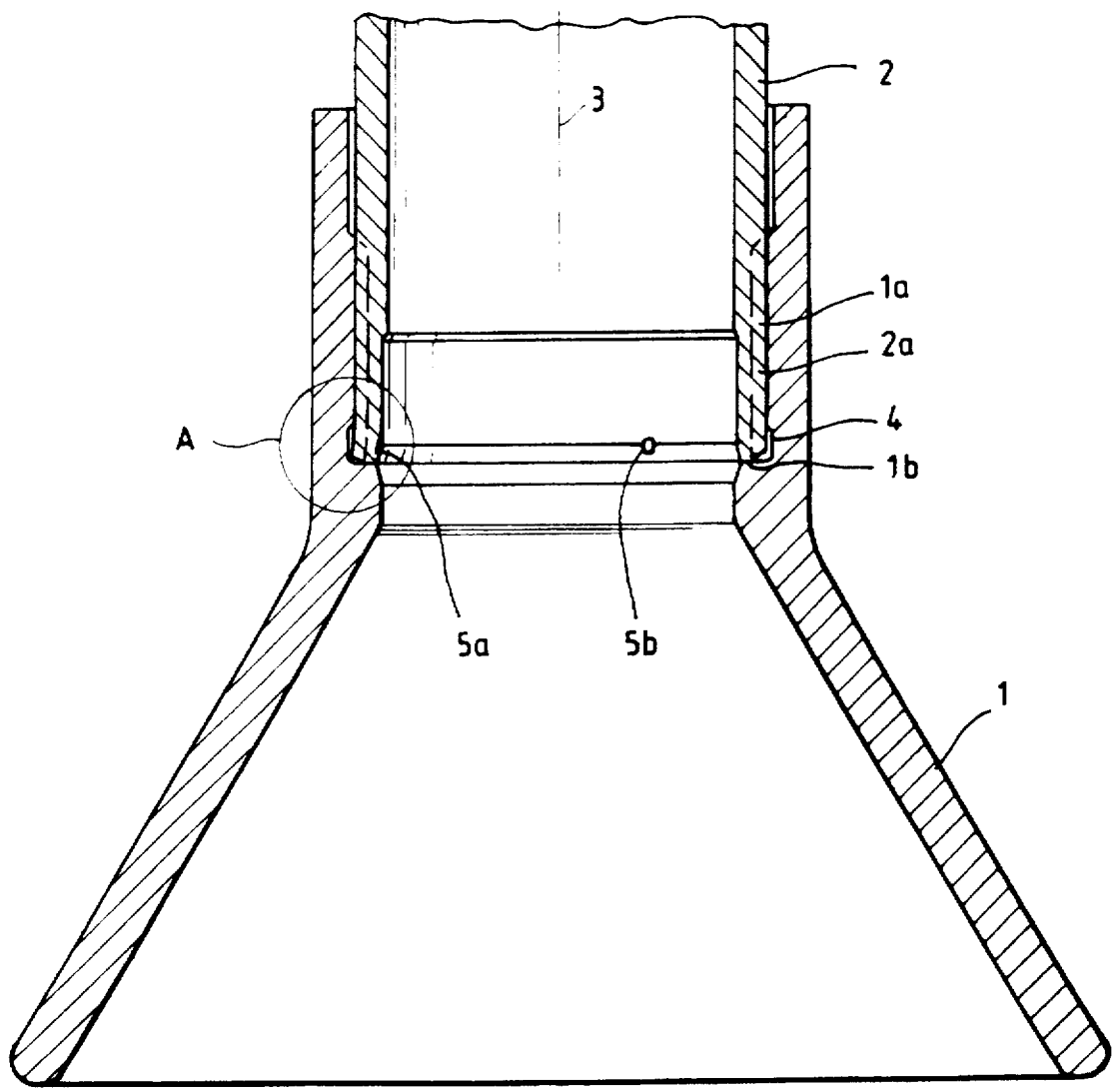
FIG. 1 is an axial sectional view of an end part of a thermal sleeve and of a guide cone, which have been attached captively using the method according to the invention.

FIG. 1 shows a thermal sleeve 2 of an adapter for passing through the head of the vessel of a pressurized-water nuclear reactor, this sleeve consisting of a tubular component of cylindrical shape. The thermal sleeve 2 is arranged coaxially inside the adapter which is engaged in an opening passing through the head of the vessel of the nuclear reactor (not represented) and welded to the head at the penetration opening. With respect to the lower end of the adapter, part of the thermal sleeve projects below the head of the vessel. The part of the thermal sleeve 2 represented in FIG. 1 constitutes the lower end part of the sleeve, the axis 3 of which is vertical when the head of the vessel is in operating position.

The lower part of the sleeve 2 has a screw thread 2a on its exterior surface for mounting and attaching a guide cone 1 in a coaxial arrangement at the end of the lower part of the sleeve. The guide cone 1 consists of a component of cylindrical/frustoconical shape, the upper cylindrical part of which has a tapped bore 1a, the characteristics of which correspond to those of the threaded part 2a of the end of the sleeve 2 so that the cylindrical part of the guide cone 1 can be screwed onto the end of the sleeve 2 about the axis which is common to the sleeve 2 and to the guide cone 1, as represented in FIG. 1.

When the guide cone 1 has been fully screwed onto the end part of the sleeve 2, the lower end of the sleeve 2 comes to abut against a shoulder 1b situated in the region where the cylindrical part and frustoconical part of the guide cone 1 meet.

Figure 1A:
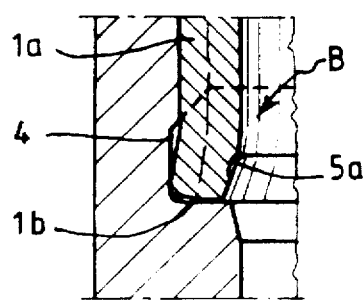
FIG. 1A is an enlarged view of detail A of FIG. 1.

According to the invention, as is visible in FIG. 1 and especially in FIG. 1A, the interior bore of the cylindrical part of the guide cone 1 has been provided between the shoulder 1b and the tapping 1a, with an annular cavity 4 projecting radially outwards with respect to the tapping 1a in which the threaded part 2a of the thermal sleeve 2 is engaged.

According to the invention, after the guide cone 1 has been screwed on, the guide cone 1 is attached captively to the end part of the sleeve by crimping the lower end part of the sleeve 2 facing the annular cavity 4 into the cavity. The crimping may be carried out at several points such as 5a and 5b distributed about the axis 3 on the internal periphery of the end of the sleeve 2.

For example, the end of the sleeve 2 may be crimped at three points such as 5a and 5b distributed at 120° about the axis 3.

Figure 1B:
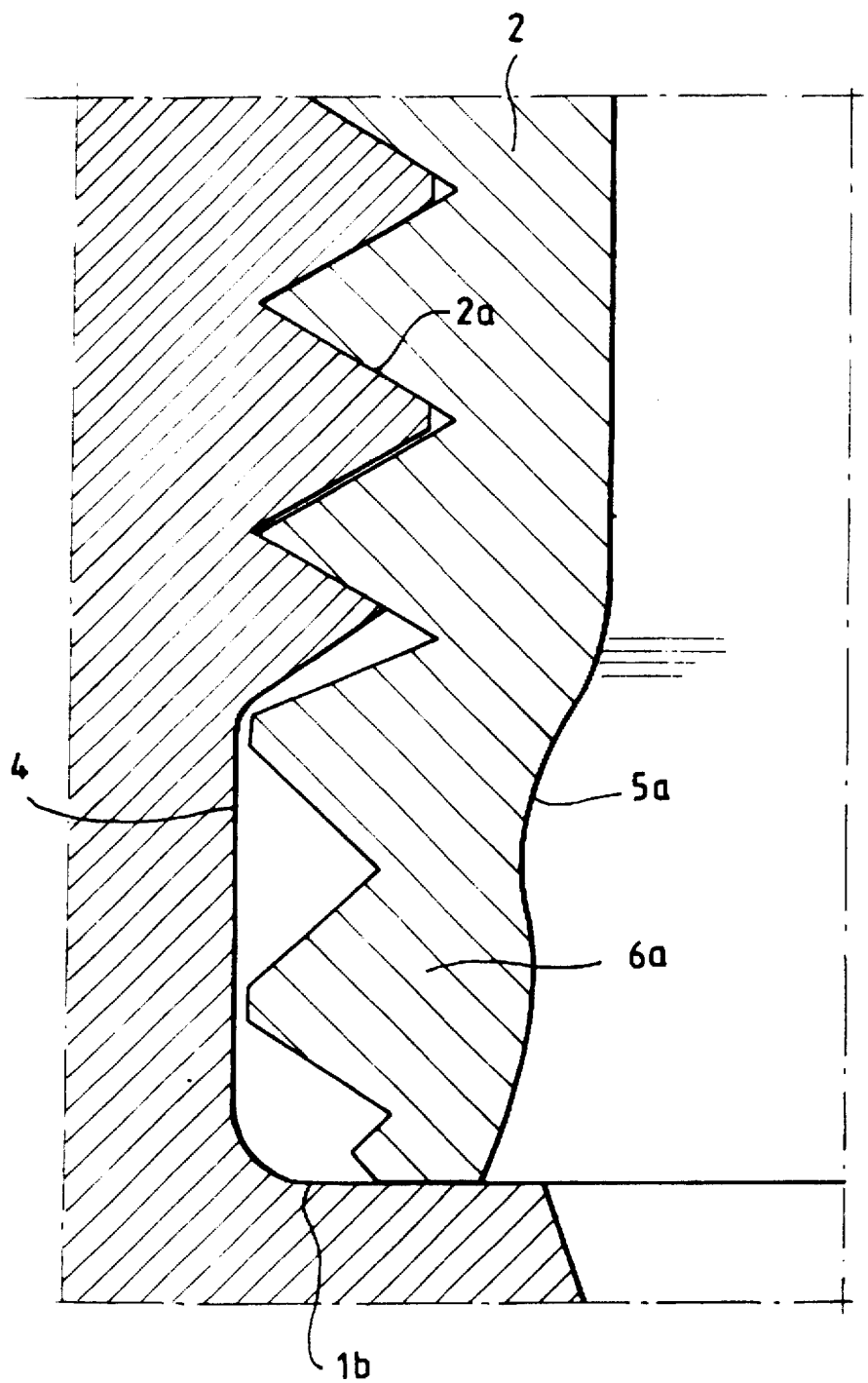
FIG. 1B is an enlarged view of detail B of FIG. 1A.

As can be seen in FIG. 1A and in FIG. 1B, at each of the points where crimping is carried out, the end of the sleeve is upset by radial expansion into the annular cavity 4 so that crimping the end of the sleeve into the cavity 4 of the guide cone 1 at three points results in captive attachment of the guide cone 1 to the sleeve 2.

In FIG. 1B, it may be seen that the end part of the sleeve 2 including the end of the screw thread 2a constitutes a region 6a deformed by compression which is upset into the cavity 4, so that it thus becomes impossible for the guide cone 1 to be removed by unscrewing.

Figure 2A:
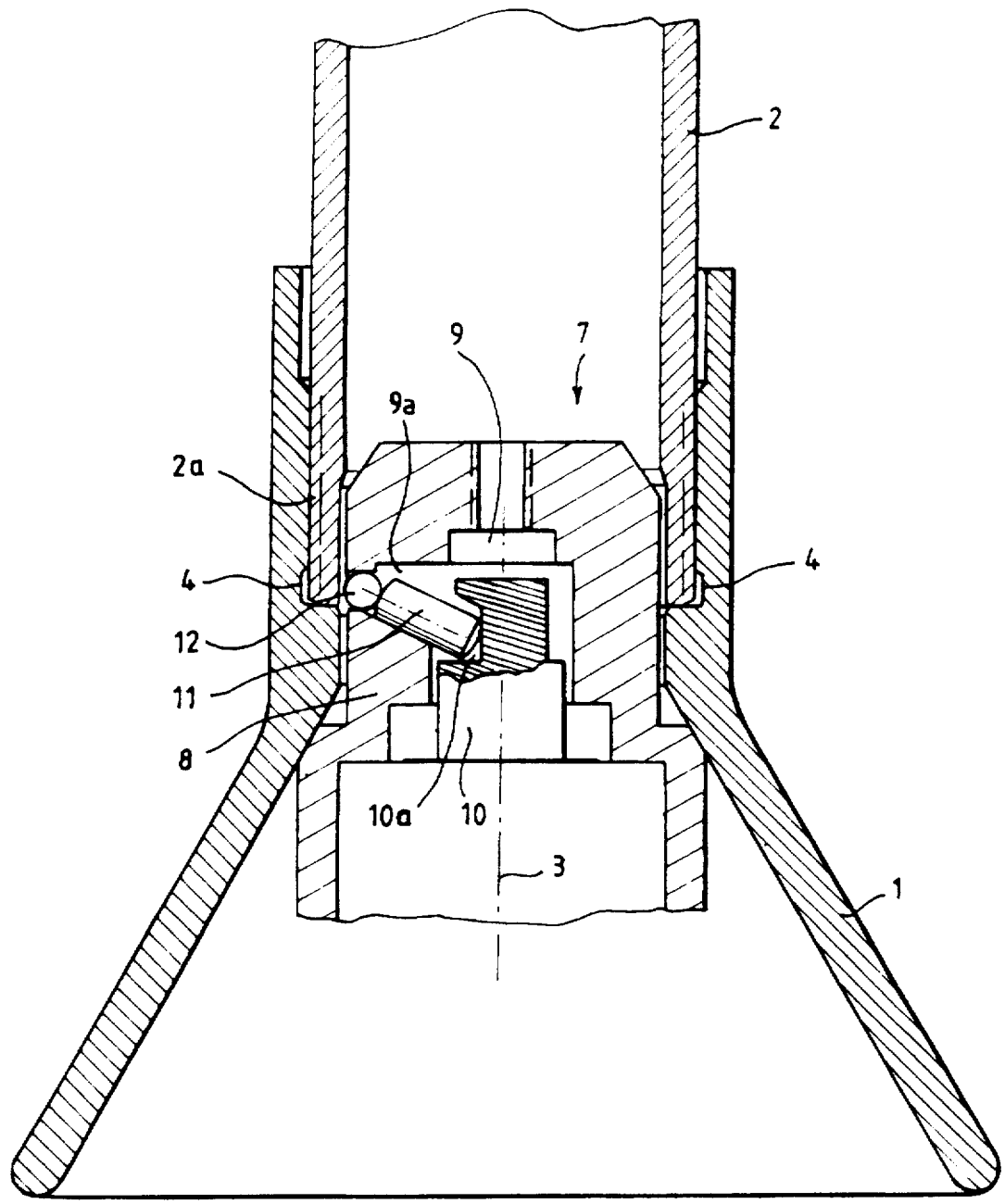
FIGS. 2A and 2B are views in section on an axial plane of the end part of a thermal sleeve of an adapter and of a guide cone during two successive phases in the method of attachment according to a first embodiment of the invention.
Figure 2B:
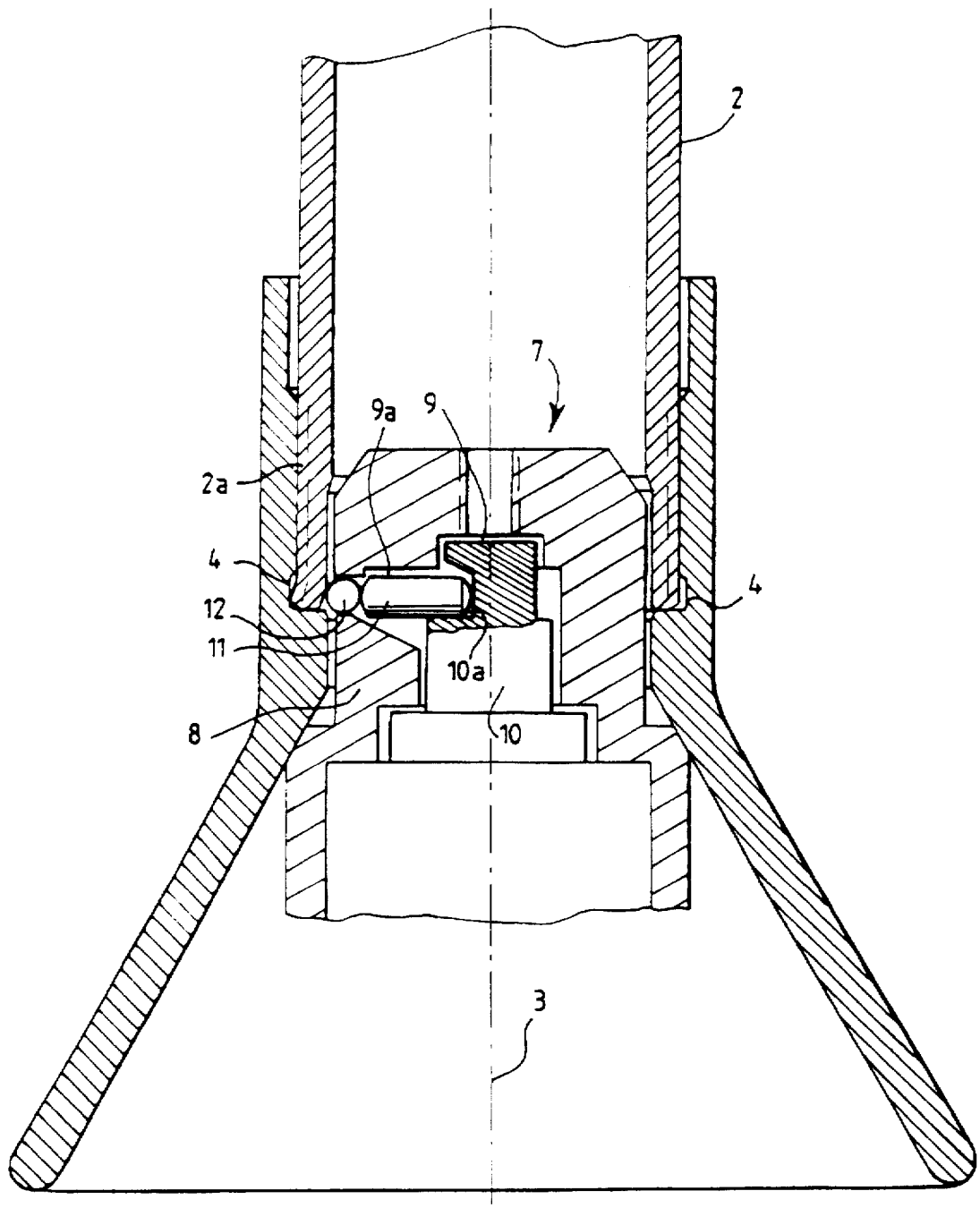

The device 7 represented in FIGS. 2A and 2B may be used for crimping the end of the sleeve 2 at several points (at least two points). In FIG. 2A, the device has been represented in an initial phase of the crimping whereas in FIG. 2B the device 7 has been represented in a final phase of the crimping.

The crimping tooling 7 includes a body 8 of substantially cylindrical shape having an end part whose diameter is slightly smaller than the minimum inside diameter of the guide cone 1 and of the lower end part of the sleeve 2.

The body 8 of the tooling is traversed by an axial opening 9, in which an axially movable push-rod 10 is engaged. The push-rod 10 includes three cavities 10a distributed at 120° about the axis 3 of the tool.

Arranged in each of the cavities 10a, and in a corresponding cavity 9a of the body 8 of the tool of radial direction communicating with the central opening 9 and the cavity 10a at one of its ends is a pin 11 having a first end in the shape of a spherical cap engaged inside the opening 10a and a second end in contact with a ball 12 housed in an end part of the opening 9a emerging on the exterior surface of the body 8 of the tool 7.

The opening 9a, which is flared inwardly in the direction of the central opening 9 of the body of the tool 8, allows the pin 11 to be accommodated in a first position represented in FIG. 2A when the push-rod 10 is in its retracted, or low, position represented in this figure. The pin 11 is then in a position which is inclined with respect to a plane perpendicular to the axis 3 of the tool and comes to rest against the lower surface of the flared opening 9a. The ball 12 is thus in a retracted position inside the exit part of the opening 9a.

As may be seen in FIG. 2B, displacing the push-rod 10 towards a high position causes the pin 11 to pivot until the moment when the pin 11 reaches a position in which its axis lies in a plane perpendicular to the axis 3. The displacement of the pin 11 between its first position and its second position brought about by displacing the push-rod 10 causes the ball 12 to pass from its retracted position represented in FIG. 2A to an extracted position represented in FIG. 2B. The displacement of the ball is obtained by the thrust of the pin 11 acting as a link rod in a radial direction. As it is displaced in the radial direction, the ball comes into contact with the interior surface of the end part of the sleeve 2 and locally upsets and crimps the end part of the sleeve 2 into the cavity 4 of the guide cone 1.

Because the tool has three identical sets each including a pin 11 and a ball 12, these three sets being arranged at 120° about the axis of the tool which is coincident with the axis 3 of the sleeve and of the guide cone 1, when the tool is in the operating position the adapter is crimped into the annular cavity 4 at three points simultaneously.

The guide cone has thus been rendered captive in a single operation.

Instead of crimping at several isolated points (at least two points) distributed at the periphery of the adapter, the adapter can be crimped around its entire circumference, for example using an expansion rolling tool including forming rollers which come into contact with the interior surface of the end part of the thermal sleeve in its region lying facing the cavity 4 and which is progressively displaced radially outwards as the tool carrying the rollers rotates.

Figure 3:
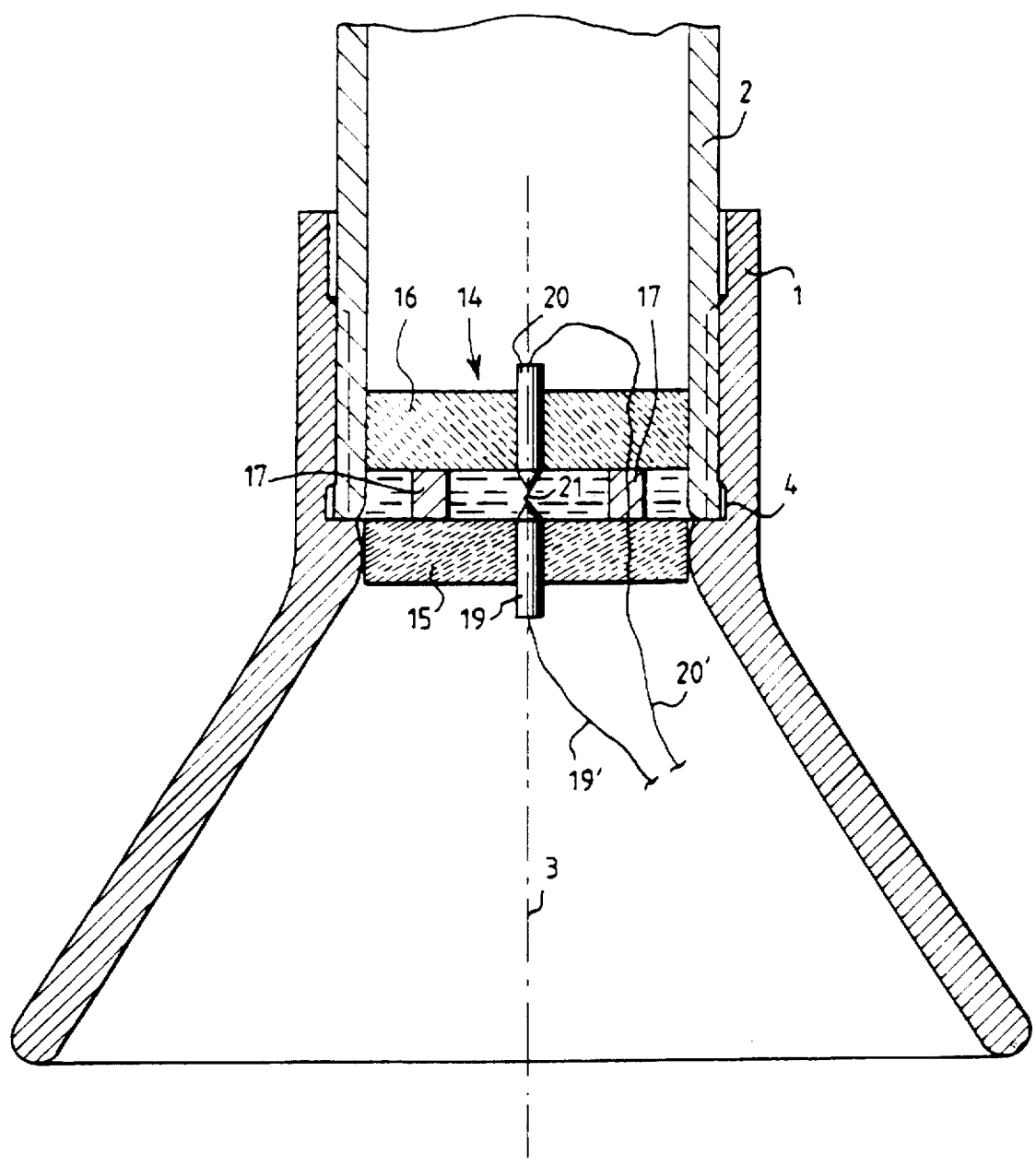
FIG. 3 is a view in axial section of the lower part of a thermal sleeve and of a guide cone during a phase of the implementation of the method of attachment according to a second embodiment of the invention.
Figure 4:
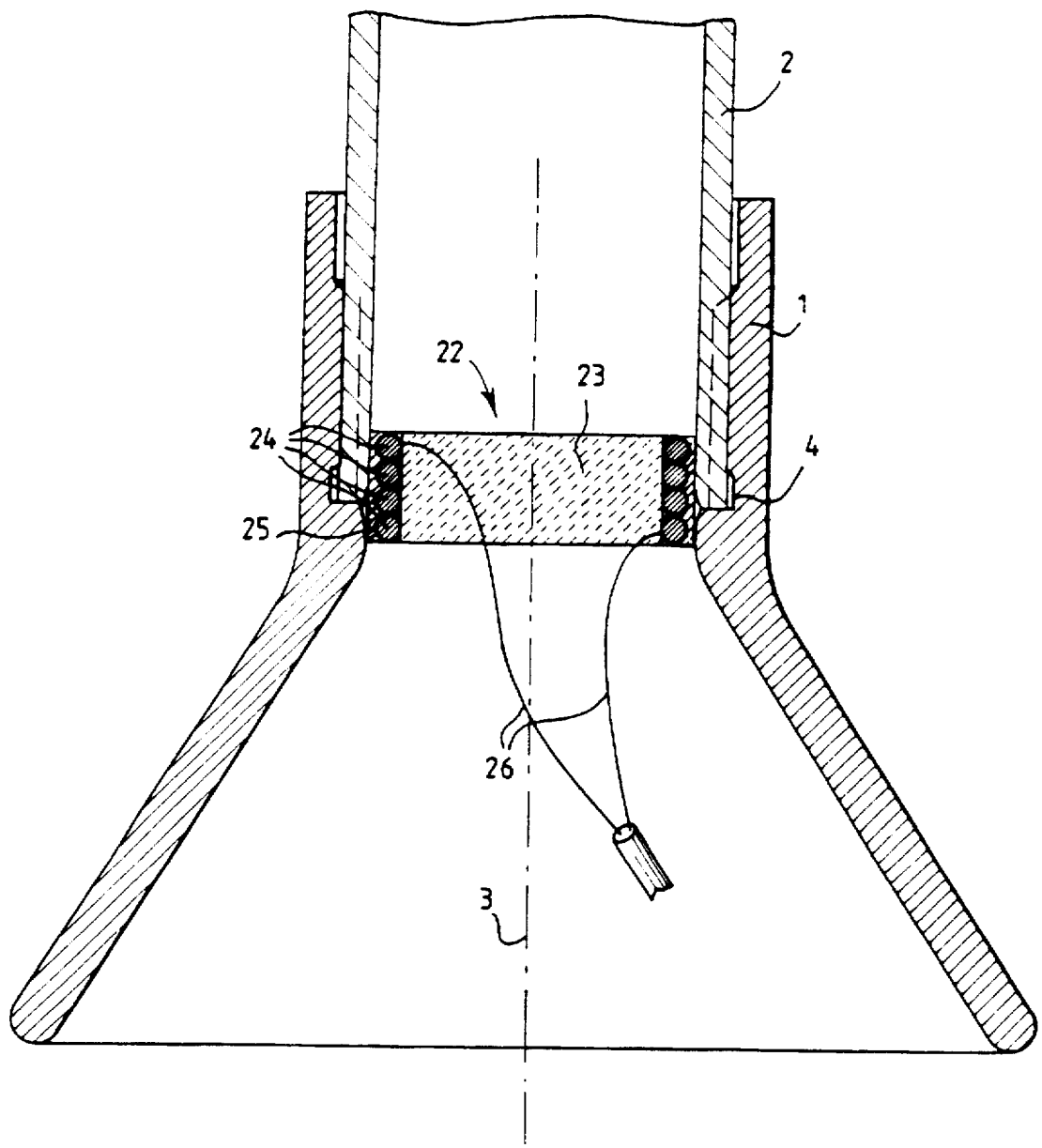
FIG. 4 is a view in axial section of the lower part of a thermal sleeve of an adapter and of a guide cone during a phase in the method of attachment according to a third embodiment of the invention.
Figure 5:
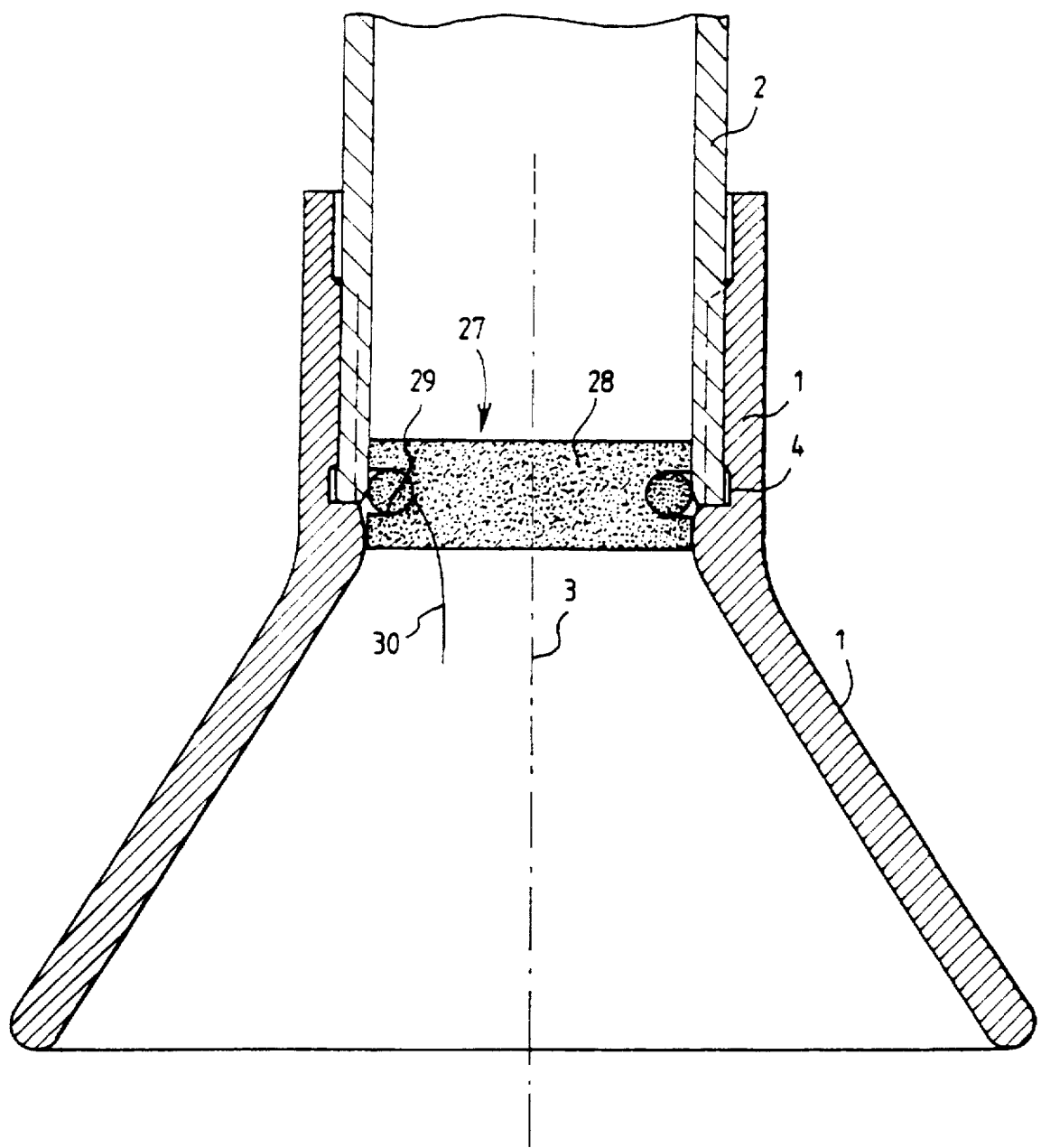
FIG. 5 is a view in axial section of an end part of an adapter thermal sleeve and of a guide cone during a phase in the method according to of a fourth embodiment of the invention.

Represented in FIGS. 3, 4 and 5 are three different embodiments of a tool allowing the end of a sleeve to be expanded radially into an annular cavity of the interior bore of a guide cone screwed onto the sleeve.

The corresponding elements in FIGS. 3, 4 and 5 on the one hand, and in FIGS. 1, 2A and 2B on the other hand, bear the same references.

Represented in FIG. 3 is tooling 14 allowing the end part of the sleeve 2 to be expanded diametrically into the cavity 4 by electrohydraulic forming.

The tool includes a first stopper 15 and a second stopper 16 whose separation from the stopper 15 in the direction of the axis 3 common to the sleeve and to the guide cone 1 in which the tool 14 is inserted is maintained at a value corresponding substantially to the length of the end part of the sleeve 2 to be deformed by radial expansion into the cavity 4, by spacer pieces 17.

The stopper 15 is engaged without clearance in a substantially watertight manner in that part of the internal bore of the guide cone 1 which lies between the cylindrical part and the frustoconical part of this bore.

The stopper 16 is also engaged without clearance inside the interior bore of the sleeve 2, above the lower part of the sleeve lying facing the cavity 4. The stoppers 15 and 16 are generally equipped with annular seals which come into contact with the interior surface of the guide cone 1 and with the interior surface of the sleeve 2, respectively.

The space left between the stoppers 15 and 16, inside the sleeve 2, is filled with a liquid which is usually water. The stopper 15 is pierced with an opening in its central part, in which an electrode 19 directed along the axis 3 is engaged in a leaktight manner. Likewise, the stopper 16 has a through-opening in its central part, in which an electrode 20 is engaged in the direction of the axis 3. The electrodes 19 and 20 have pointed or frustoconical parts directed towards one another inside the space between the stoppers 15 and 16, in the direction of the axis 3. The end parts facing one another in the direction of the axis 3 belonging to the electrodes 19 and 20 are connected by a metal wire 21 constituting a meltable wire for striking an arc between the electrodes 19 and 20.

The electrodes 19 and 20 are connected by corresponding electrical conductors 19' and 20' to an electric generator capable of supplying a strong current at high voltage in the form of pulses. When a current pulse is sent to the electrodes 19, 20, the striking wire 21 through which the current flows melts and an electric arc is formed between the electrodes. The electric arc which is set up between the electrodes 19 and 20 during the electrical discharge produces pressure waves in the space between the stoppers 15 and 16, and these pressure waves are transmitted to the end part of the sleeve 2 by the water with which this space is filled. The pressure waves cause a radial deformation of the end part of the sleeve 2 by expansion, and this end part is thus introduced into the cavity 4.

Represented in FIG. 4 is tooling 22 allowing the end part of the sleeve 2 to be expanded radially into the cavity 4 of the guide cone 1 by electromagnetic forming.

The electromagnetic forming device consists of a coil 22 including an insulating support 23 having good mechanical strength, about which is arranged a winding 24 including several turns of a metallic wire having a diameter of the order of 3 mm. The winding 24 is externally coated with a layer of metal consisting, for example, of aluminium or of copper having a thickness of the order of 0.5 mm. The winding 24 is connected by electric current power cables 26 to an electric current generator capable of supplying a current in the form of high strength pulses at high voltage. A current generator identical to the generator used for electrohydraulic forming may be used.

When the tooling 22 is inserted inside the bore of the sleeve 2, as represented in FIG. 4, the coupling layer 25 with which the external surface of the winding 24 is covered comes into contact with the interior bore of the sleeve 2 in its end region and with the interior bore of the guide cone 1 in the part where its cylindrical part and frustoconical part meet and provides coupling, without an air gap, between the winding 24 of the coil 22 and the end part of the sleeve 2.

By powering the winding 24 of the coil using the pulse generator, a current is produced which flows through the winding 24 in the form of a decaying discharge. The current running through the turns of the winding 24 includes a current in the metal of the end part of the sleeve 2 which is magnetically coupled to the winding 24 of the coil 22. The induced current runs in a circumferential direction and in the opposite sense to the current running through the winding 25 which induced it. This results in forces of electromagnetic origin and of radial direction directed outwards and which are exerted on the end part of the sleeve 2. The end of the sleeve 2 is thus expanded radially into the cavity 4, around its entire periphery.

Represented in FIG. 5 is a device 27 for explosive forming inserted into the interior bore of the sleeve 2, close to the end region of the sleeve placed facing the annular cavity 4 of the guide cone 1. The tooling 27 for explosive forming includes a polyethylene support 28 of substantially cylindrical shape, the outside diameter of which is substantially equal to the inside diameter of the sleeve 2. A cavity 29 is machined in the external peripheral part of the support 28, in the form of a torus, the circular section of which has a diameter close to 8 mm. The cavity 29 is filled with explosive which may consist of BETN or TACOT. An electric igniter circuit 30 is connected to the mass of explosive arranged in the cavity 29.

By electric ignition, the explosive substance contained within the cavity 29 which is in contact with the interior surface of the sleeve 2 lying facing the cavity 4 is exploded. By explosion, the end part of the sleeve 2 is expanded radially into the cavity 4.

In all cases, the sleeve is expanded radially into the cavity of the guide cone in a single operation of short duration, allowing the guide cone to be attached captively to the sleeve. This captive attachment is achieved without employing welding operations which would run the risk of leading to the end of the sleeve and/or the guide cone being weakened. It is therefore possible to eliminate practically any risk of a guide cone and a thermal sleeve becoming separated inside the nuclear reactor, using an operation which is simple and quick to implement after the guide cone has been mounted on the thermal sleeve.

It is possible to use other methods of mechanical forming or other types of method for radially expanding the end part of the thermal sleeve into the cavity of the guide cone.

The method according to the invention may also be used for captively attaching a guide cone to the upper part of an adapter for passing thermocouples through the head of the vessel of a nuclear reactor, this part lying outside the vessel.

I claim:

1. A method for captively attaching a tubular guide cone onto a threaded end part of an exterior surface of a thermal sleeve of an adaptor for passing through the head of a vessel of a pressurized water nuclear reactor, said method comprising the steps of providing an annular cavity in an internal part of a tapped bore of said guide cone, screwing the tapped bore of said guide cone onto the threaded end of the thermal sleeve and expanding at least part of the end of the thermal sleeve radially into the cavity of the guide cone from inside the thermal sleeve and the guide cone.

2. The method according to claim 1, comprising expanding the end of the thermal sleeve radially into the cavity of the guide cone at several separate crimping points distributed around the periphery of the end part of the thermal sleeve about an axis common to the guide cone and to the thermal sleeve about which the guide cone is screwed onto the thermal sleeve.

3. The method according to claim 2, comprising deforming the end part of the thermal sleeve radially at several crimping points by upsetting the end part of the thermal sleeve in radial directions using balls on which forces are exerted in radial directions.

4. The method according to claim 3, comprising exerting simultaneously radial forces on at least two balls for upsetting the metal of the end part of the thermal sleeve via a push-rod and pins each interposed between the push-rod and a ball, the push-rod being displaced in the axial direction and the pins constituting link rods which transmit radial forces to the balls during the displacement of the push-rod.

5. The method according to claim 1, comprising expanding the end part of the thermal sleeve radially into the cavity of the first tubular component over the entire periphery of the end part of the second component.

6. The method according to claim 5, comprising expanding the end part of the second component radially by electro-hydraulic forming, with the formation of an electric arc between two electrodes facing one another in an interior space of the guide cone and of the thermal sleeve, this space being adjacent to the cavity of the guide cone and filled with a liquid that transmits pressure waves.

7. The method according to claim 5, comprising expanding the end part of the thermal sleeve diametrically into the annular cavity of the guide cone by electromagnetic forming with the aid of a winding of a coil having an insulating support and a coupling metallic external layer, the winding being inserted inside the end part of the thermal sleeve and powered with electrical current in the form of a pulse producing a decaying discharge.

8. The method according to claim 5, comprising expanding the end part of the thermal sleeve radially into the annular cavity of the guide cone by explosion, a ring of explosive being placed in contact with the interior surface of the end part of the second tubular component and ignited so that an explosion takes place on contact with the end part of the thermal sleeve, facing the cavity in the first annular component.

9. The method according to claim 5, comprising expanding the end part of the thermal sleeve radially into the annular cavity of the guide cone by expansion rolling the end part of the thermal sleeve from inside the guide cone and the thermal sleeve.

* * * * *